(12) United States Patent
Locker et al.

(10) Patent No.: US 7,765,407 B2
(45) Date of Patent: Jul. 27, 2010

(54) METHOD AND APPARATUS FOR PROVIDING CENTRALIZED USER AUTHORIZATION TO ALLOW SECURE SIGN-ON TO A COMPUTER SYSTEM

(75) Inventors: Howard Locker, Cary, NC (US); Daryl Cromer, Cary, NC (US); Randall S. Springfield, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 855 days.

(21) Appl. No.: 11/612,092

(22) Filed: Dec. 18, 2006

(65) Prior Publication Data

US 2008/0148389 A1 Jun. 19, 2008

(51) Int. Cl.
*G06F 21/00* (2006.01)
(52) U.S. Cl. .............................. 713/183; 713/160; 726/2; 726/4; 726/17; 726/21
(58) Field of Classification Search ................. 713/183, 713/160; 726/1–33
See application file for complete search history.

(56) References Cited

U.S. PATENT DOCUMENTS 7,280,030 B1 * 10/2007 Monaco ..................... 340/5.21
2002/0144128 A1 * 10/2002 Rahman et al. ............. 713/186
2007/0005951 A1 * 1/2007 Davis et al. .................... 713/2
2007/0198656 A1 * 8/2007 Mazzaferri et al. .......... 709/218
2007/0235517 A1 * 10/2007 O'Connor et al. ........... 235/375
2007/0294496 A1 * 12/2007 Goss et al. .................. 711/163

* cited by examiner

*Primary Examiner*—Carl Colin
*Assistant Examiner*—Helai Salehi
(74) *Attorney, Agent, or Firm*—Antony P. Ng; Dillon & Yudell LLP

(57) ABSTRACT

A method for providing centralized user authorization to allow secure sign-on to a computer system is disclosed. In response to a user attempting to boot up a computer system, a message is sent to a trusted server by a hypervisor within the computer to request a new hard drive password for the computer system. If the user is not authorized to access the computer system, a packet is sent by the trusted server to instruct the hypervisor to stop any boot process on the computer system. If the user is authorized to access the computer system, a packet containing a partial hard drive password is sent by the trusted server to the computer system. The packet is then encrypted with a system public key by the computer system to yield the partial hard drive password. The computer system subsequently combines the partial hard drive password with a user password to generate a new complete hard drive password to continue with the boot process.

15 Claims, 3 Drawing Sheets

METHOD AND APPARATUS FOR PROVIDING CENTRALIZED USER AUTHORIZATION TO ALLOW SECURE SIGN-ON TO A COMPUTER SYSTEM

BACKGROUND OF THE INVENTION

1. Technical Field

The present invention relates to computer security in general, and, in particular, to a method and apparatus for providing security management in computer systems. Still more particularly, the present invention relates to a method and apparatus for providing centralized user authorization to allow secure sign-on to a computer system.

2. Description of Related Art

Within a corporation, some computer systems are likely to have sensitive information stored on their hard drives. It is necessary to prevent such sensitive information from being accessed by people that are not authorized to access such sensitive information.

Conventional methods for preventing sensitive information from being accessed by unauthorized individuals include data encryption, password protection, etc. However, a computer user's access privilege to a computer system within an organization may change from time to time. For example, an employee's computer access privileges can be changed due to changing job responsibilities. Most, if not all, of the conventional methods do not allow a network administrator to change a computer user's computer access privileges to one or more computer systems in a convenient manner.

Consequently, it would be desirable to provide an improved method and apparatus for providing centralized user authentication to allow secure sign-on to a computer system.

SUMMARY OF THE INVENTION

In accordance with a preferred embodiment of the present invention, in response to a user attempting to boot up a computer system, a message is sent to a trusted server by a hypervisor within the computer to request a new hard drive password for the computer system. If the user is not authorized to access the computer system, a packet is sent by the trusted server to instruct the hypervisor to stop any boot process on the computer system. If the user is authorized to access the computer system, a packet containing a partial hard drive password is sent by the trusted server to the computer system. The packet is then encrypted with a system public key by the computer system to yield the partial hard drive password. The computer system subsequently combines the partial hard drive password with a user password to generate a new complete hard drive password to continue with the boot process.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
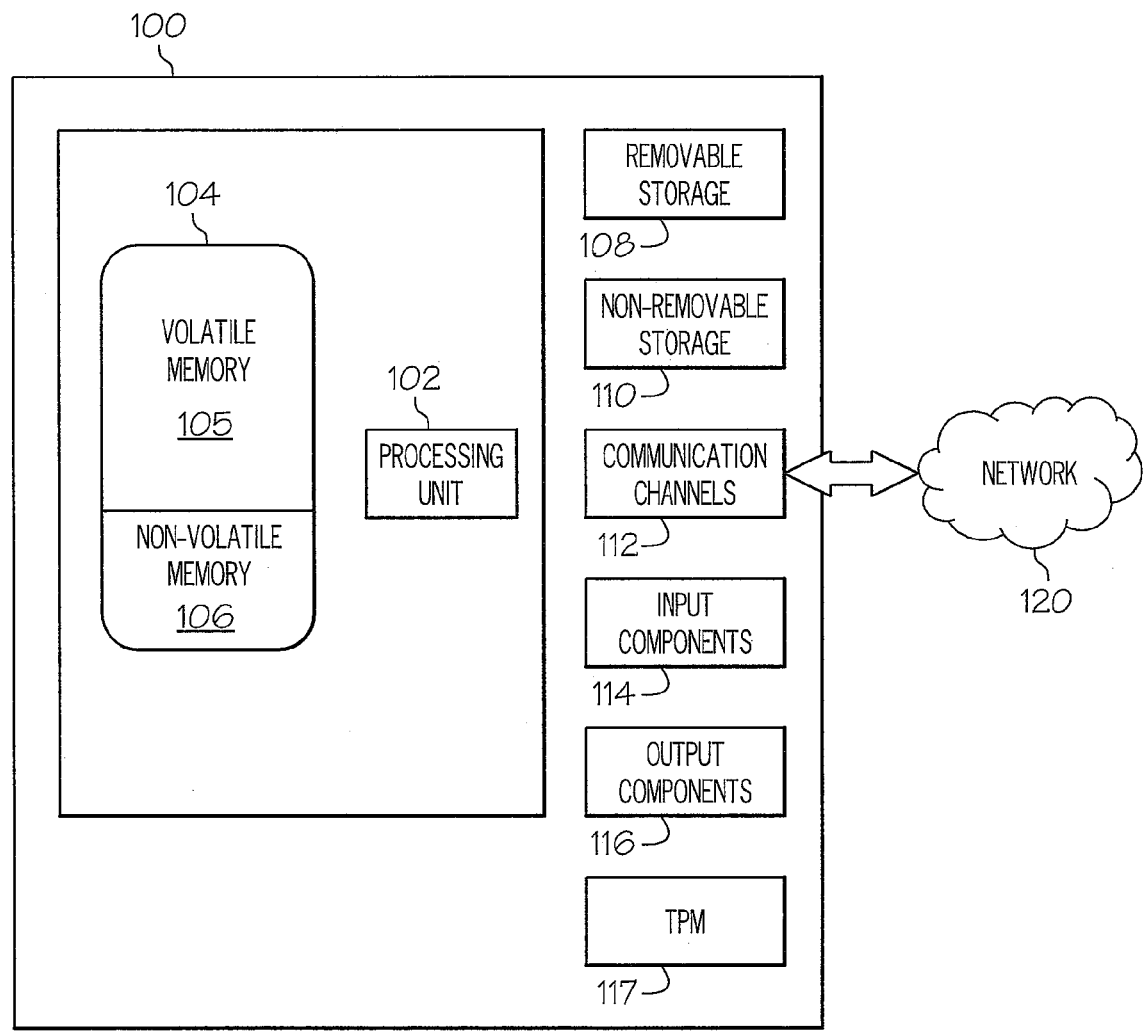
FIG. 1 is a block diagram of a computer system in which a preferred embodiment of the present invention is incorporated.

Referring now to the drawings and in particular to FIG. 1, there is depicted a block diagram of a computer system in which a preferred embodiment of the present invention is incorporated. As shown, a computer system 100 includes a processing unit 102 and a memory 104. Memory 104 includes a volatile memory 105 (such as a random access memory) and a non-volatile memory 106 (such as a read-only memory). Computer system 100 also contains removable storage media devices 108, such as compact discs, optical disks, magnetic tapes, etc., and non-removable storage devices 110, such as hard drives. In addition, computer system 100 may contain communication channels 112 for providing communications with other computer systems on a network 120. Computer system 100 may also have input components 114 such as a keyboard, mouse, etc., and output components 116 such as displays, speakers, printers, etc.

A Trusted Platform Module (TPM) 117 is included within computer system 100 to provide secure generations of cryptographic keys, and limits the use of those keys to either signing/verification or encryption/decryption, as it is known to those skilled in the art. TPM 117 can be utilized to ensure that data being used to grant access to the operating system of computer system 100 is maintained securely.

Figure 2:
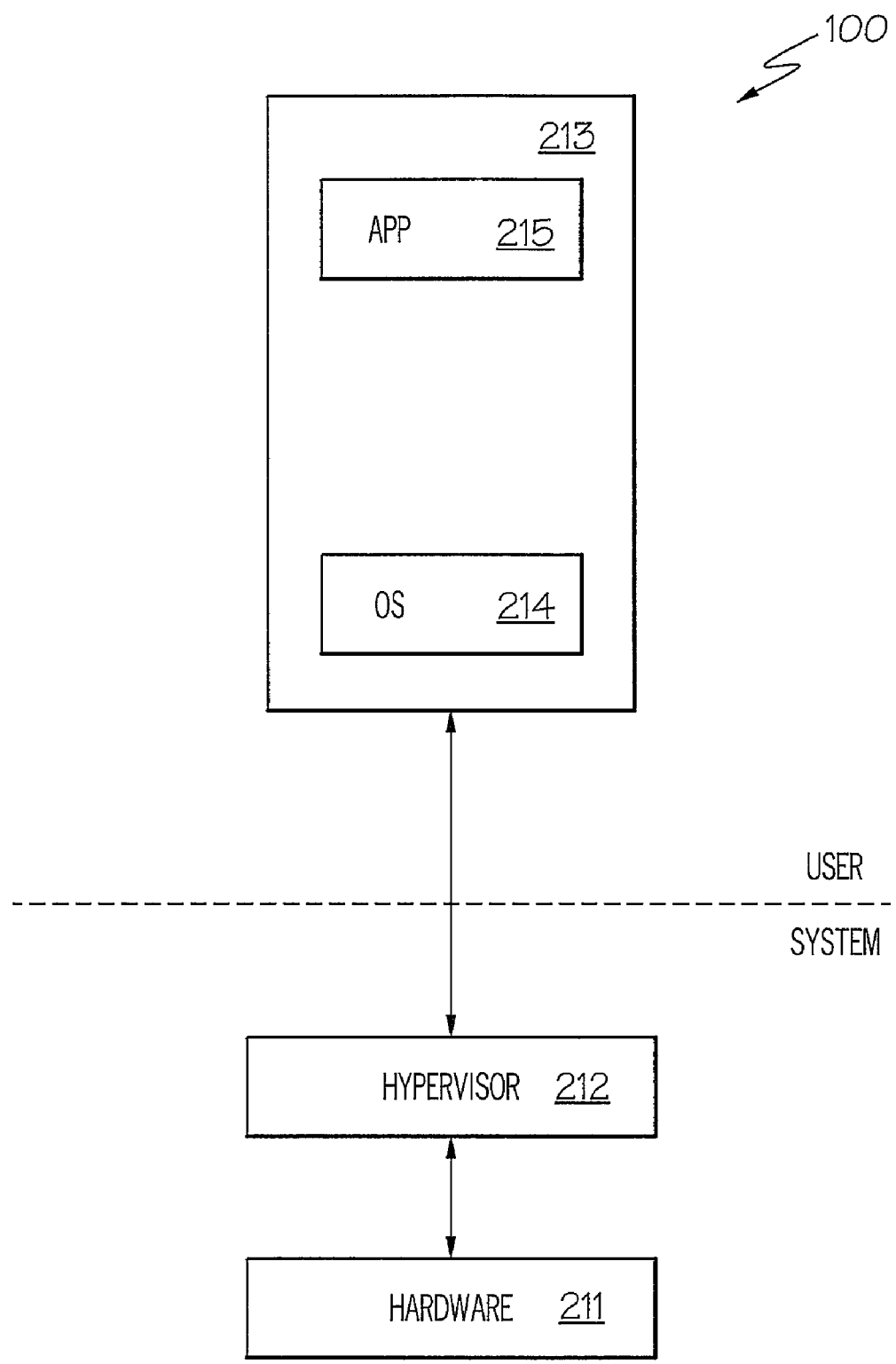
FIG. 2 is a block diagram of the software within the computer system from FIG. 1, in which a preferred embodiment of the present invention is incorporated.

With reference now to FIG. 2, there is depicted a block diagram of the software within computer system 100, in which a preferred embodiment of the present invention is incorporated. As shown, computer system 100 includes a hardware structure 211, a hypervisor or virtual machine manager (VMM) 212 and a virtual machine 213. Hypervisor 212 controls all communications to virtual machine 213. In addition, hypervisor 212 can directly communicate with hardware structure 211. Hardware structure 211 includes various hardware components depicted in FIG. 1.

An operating system and multiple application programs can be executed concurrently within virtual machine 213. For example, an operating system 214 and an application program 215 are executed within virtual machine 213. Operating system 215 can be Windows® operating system manufactured by the Microsoft Corporation. Similarly, the underlying processor emulated by virtual machine 213 can be a Pentium® processor manufactured by the Intel Corporation.

Virtual machine 213, which includes its operating system and associated application programs, operates at a user-level. When hypervisor 212 uses direct execution, hypervisor 212 is set to a so-called user-mode (i.e., with reduced privileges) so that virtual machine 213 cannot directly access the various privileged registers that control the operation of hardware structure 211. Rather, all privileged instructions will be trapped into hypervisor 212.

In accordance with a preferred embodiment of the present invention, hypervisor 212 requires a first password sent from a remote trusted server and a second password entered by a computer user in order to generate a third password for accessing a hard drive within computer system 100. The hard drive requires an embedded password that protects a percentage of the drive space from unauthorized accesses. For example, the hard drive allows a selected portion of the hard drive to be protected with a hard drive password while leaving the rest of the hard drive readable without using any password.

During power-on of computer system 100, the basic input/output system (BIOS) loads hypervisor 212 from the part of the hard drive that is not protected by any password. Hypervisor 212 also contains an application program that allows a computer user to enter a user password and allows computer system 100 to communicate to a network trusted server in a secured manner. Hypervisor 212 can also be stored in a system read-only memory, but storing hypervisor 212 in the hard drive would be more economical.

The boot process can use a dynamic root of trust to ensure that hypervisor 212 and the associated programs are not tampered with. The dynamic root of trust measures the software environment and proves that it is trustworthy to proceed to a network logon procedure.

Figure 3:
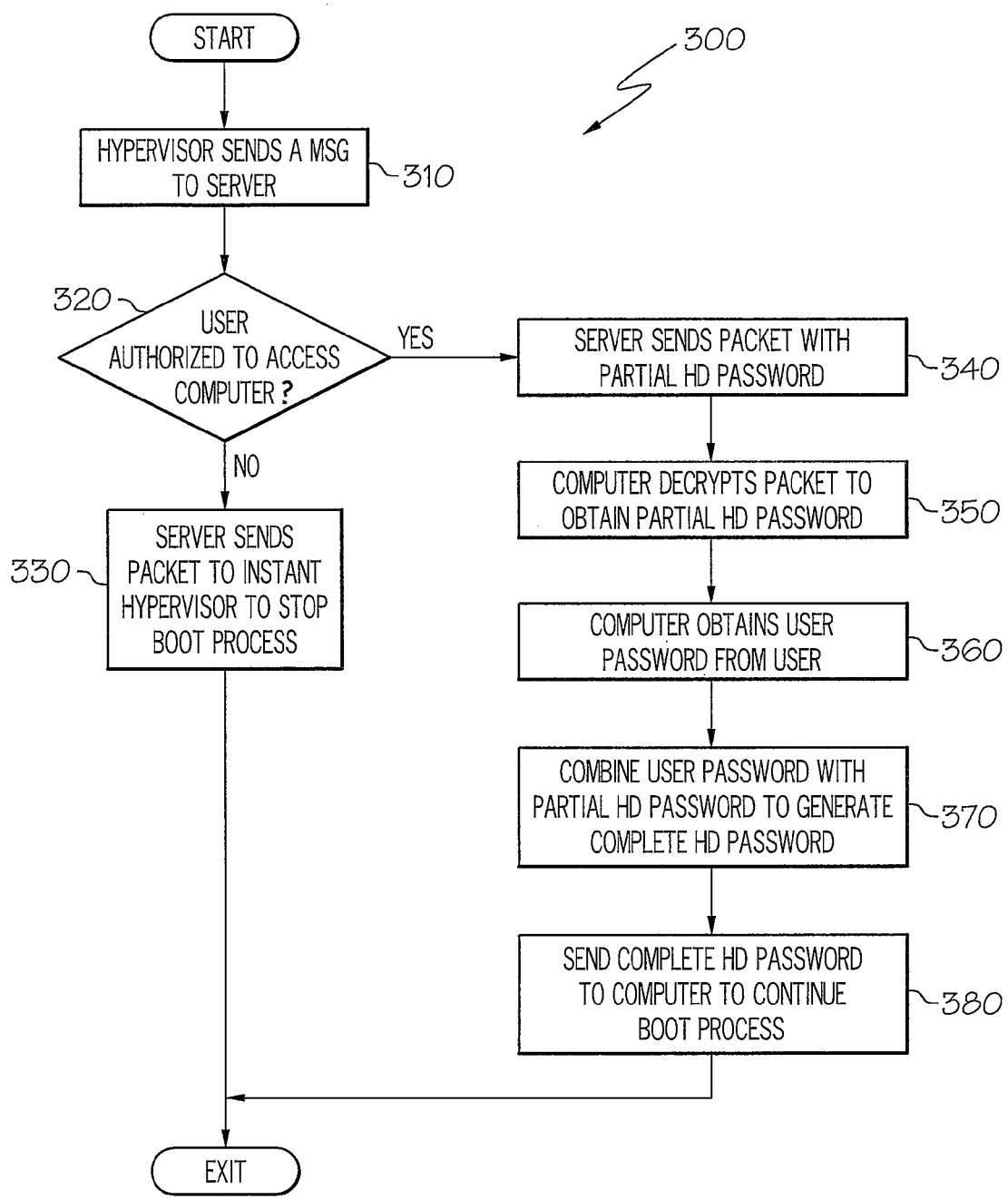
FIG. 3 is a high-level logic flow diagram of a method for providing centralized user authentication to allow secure sign-on to a computer system, in accordance with a preferred embodiment of the present invention.

Referring now to FIG. 3, there is depicted a high-level logic flow diagram of a method for providing centralized user authorization to allow secure sign-on to a computer system, in accordance with a preferred embodiment of the present invention. Starting at block 300, in response to a user attempting to boot up a computer system, a hypervisor within the computer system uses a TPM private key to send a message to a remote trusted server to indicate that the hypervisor needs to generate a new hard drive password for the computer system, as shown in block 310.

A determination is then made by the trusted server to see if the user is still authorized to access data in the hard drive within the computer system, as depicted in block 320. If the user is not authorized to access data in the hard drive within the computer system, then the trusted server sends a packet to instruct the hypervisor to stop the boot process, as shown in block 330.

Otherwise, if the user is authorized to access data in the hard drive within the computer system, then the trusted server sends back a packet containing a partial hard drive password that has been encrypted with a system public key, as depicted in block 340. The computer system then decrypts the packet using its public key in the TPM, as shown in block 350. The computer system also requests a user password from the user, as depicted in block 360. The user password is subsequently combined with the partial hard drive password from the trusted server to generate a new complete hard drive password, as shown in block 370. The new complete hard drive password is sent to the hard drive of the computer system to continue with the boot process, as depicted in block 380.

After the operating system has been loaded, the computer system can proceed with a full user network logon with requirement of current user logon credentials such as passwords, catch phases, biometrics, etc. Since the hard drive password for a computer user includes two parts, and one part is stored in a trusted server, it is possible for a network administrator to change the status of the computer user conveniently at the trusted server without the knowledge of the computer user.

As has been described, the present invention provides an improved method and apparatus for providing centralized user authentication to allow secure sign-on to a computer system. With the present invention, a network administrator is able to change a user's privilege to access any computer system at a trusted server. The user is not aware of the requirement of a new hard drive password because the user assumes the user password is the hard drive password. In addition, a user will not be able to log on to a computer network if a hypervisor preload has been tampered with (i.e., fails dynamic root of trust), secure server does not authenticate user, or the user does not have correct logon credentials.

It is also important to note that although the present invention has been described in the context of a fully functional computer system, those skilled in the art will appreciate that the mechanisms of the present invention are capable of being distributed as a program product in recordable type media such as floppy disks or compact discs.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method comprising:
   in response to a user attempting to boot up a computer system, sending a message to a server by a hypervisor within said computer system to request a new hard drive password for said computer system;
   if said server determines that said user is not authorized to access said computer system, sending a packet by said server to instruct said hypervisor to stop any boot process on said computer system;
   if said server determines that said user is authorized to access said computer system,
   sending a packet containing a partial hard drive password by said server;
   combining said partial hard drive password with a user password by said computer system to generate a complete hard drive password; and
   sending said complete hard drive password to a hard drive of said computer system to continue boot process.

2. The computer-implemented method of claim 1, wherein said packet is encrypted with a system public key.

3. The computer-implemented method of claim 2, wherein said method further includes decrypting said packet by said computer system to yield said partial hard drive password using a public key.

4. The computer-implemented method of claim 3, wherein said public key is stored in a Trusted Platform Module within said computer system.

5. The computer-implemented method of claim 1, wherein said combining further includes requesting said user password from said user.

6. A computer usable medium having a computer program product for providing centralized user authentication to allow secure sign-on to a computer system, said computer usable medium comprising:
   computer program code for, in response to a user attempting to boot up a computer system, sending a message to a server by a hypervisor within said computer system to request a new hard drive password for said computer system;
   computer program code for, if said server determines that said user is not authorized to access said computer system, sending a packet by said server to instruct said hypervisor to stop any boot process on said computer system;
   computer program code for, if said server determines that said user is authorized to access said computer system,
   sending a packet containing a partial hard drive password by said server;
   combining said partial hard drive password with a user password by said computer system to generate a complete hard drive password; and
   sending said complete hard drive password to a hard drive of said computer system to continue boot process.

7. The computer usable medium of claim 6, wherein said packet is encrypted with a system public key.

8. The computer usable medium of claim 7, wherein said computer usable medium further includes computer program code for decrypting said packet by said computer system to yield said partial hard drive password using a public key.

9. The computer usable medium of claim 8, wherein said public key is stored in a Trusted Platform Module within said computer system.

10. The computer usable medium of claim 6, wherein said computer program code for combining further includes computer program code for requesting said user password from said user.

11. An apparatus comprising:

a hardware structure;

a hypervisor configured to, in response to a user attempting to boot up a computer system, sending a message to a server to request a new hard drive password for said computer system;

wherein said server, after said server has determined that said user is not authorized to access said computer system, sends a packet to instruct said hypervisor to stop any boot process on said computer system;

wherein said server, after said server has determined that said user is authorized to access said computer system, sends a packet containing a partial hard drive password by said server;

combines said partial hard drive password with a user password by said computer system to generate a complete hard drive password; and sends said complete hard drive password to a hard drive of said computer system to continue boot process.

12. The apparatus of claim 11, wherein said packet is encrypted with a system public key.

13. The apparatus of claim 12, wherein said apparatus further includes a public key for decrypting said packet to yield said partial hard drive password.

14. The apparatus of claim 13, wherein said public key is stored in a Trusted Platform Module within said computer system.

15. The apparatus of claim 11, wherein said server also requests said user password from said user.

* * * * *